2,993,019
FLAME RETARDED POLYETHYLENE
John A. Snyder, Plainfield, N.J., assignor to Union Carbide Corporation, a corporation of New York
No Drawing. Filed May 21, 1958, Ser. No. 736,682
8 Claims. (Cl. 260—28.5)

This invention relates to polyethylene compositions and more particularly to polyethylene compositions useful in electrical applications, especially as building wire insulation.

It is well known that the physical characteristics of polyethylene, such as strength, moisture resistance, chemical inertness and its outstanding electrical properties, make it highly suitable for wire insulation, cable jacketing and similar applications. It is also known, however, that polyethylene is quite flammable. It is ignited by an open flame and continues to burn after removal of the flame. This property of the resin has severely reduced the number of electrical applications to which it can be put and has completely precluded its use in building wire insulation.

Heretofore, polyethylene resins having densities below about 0.92 have been made satisfactorily flame-resistant by use of various flame-retardant compounds which are known in the art, herein below more fully described, without adverse effect on the important physical properties of the resin. However, resins having higher densities, i.e. above about 0.94, when similarly treated with known flame-retardant compounds have been found to thereby lose important physical characteristics. Primary among the physical characteristics which are effected is the brittle temperature which is significantly raised rendering the resins unacceptable for many applications. "Brittle temperature" is an index to a material's toughness under stress at low temperature. The lower the brittle temperature the greater the toughness of the material at low temperature.

As an illustration of the serious effect on brittle temperatures, it has been found that the incorporation of an amount of flame-retardant compound sufficient to make a low density, i.e. about 0.92 or less polyethylene resin flame-resistant raises the brittle temperature of the resin from about —95° C., to about —30° C. but the same amount incorporated in a higher density resin, i.e. about 0.94 and above raises the brittle temperature thereof from about —98° C. to about +32° C. Obviously a material such as the latter is prone to stress rupture even at room temperature and would be totally unsuitable for application such as wire insulation. Similarly, the lower density flame-resistant resins are not altogether suitable, for although their brittle temperature is satisfactory they cannot meet other physical requirements. Standards have been set up by Underwriter's Laboratories Inc. which electrical apparatus must meet. Among the minimum requirements set up by the Underwriter's Laboratories is that material to be used as insulation for building wire and the like should exhibit less than 50% deformation at 120° C. when tested in a prescribed manner. Polyethylenes having a density of less than 0.92 generally melt at temperatures about or below 115° C. and are thus unusable. Higher density polyethylenes which melt above 120° C. are able to meet this percent deformation requirement, and with improvement in their brittle temperatures, they would be suitable for the most critical wire insulation applications.

It is therefore an object of the present invention to provide polyethylene compositions which retain all important physical characteristics and are flame-retarded as well.

Another object of my invention is to provide polyethylene compositions which are in all characteristics, especially brittle temperature, flame-resistance and percent deformation suitable as building wire insulation.

These and other objects of my invention are achieved by incorporating in a higher density flame-retarded polyethylene resin, an amount of rubber compound corresponding to 5 to 70 parts by weight per hundred parts of the polyethylene in the composition. Contrary to ordinary expectation the incorporation of the rubber compound does not detract from the strength of the resin at low temperatures, but rather such incorporation unexpectedly confers a substantial improvement in low temperature behavior.

This is highly surprising because ordinarily the addition of a rubber compound to a polyethylene resin is especially deleterious to the brittle temperature of the material.

Table I summarizes the usual effects of adding a rubber compound to a polyethylene resin.

TABLE I

[All parts by weight]

| | | | |
|---|---|---|---|
| Resin (M.I. 0.3) (Sp. gr. 0.95) | 99.9 | 94.9 | 89.9 |
| Rubber compound (GRI-17) | 0 | 5 | 10 |
| Antioxidant | 0.1 | 0.1 | 0.1 |
| Brittle Temp., ° C. (ASTM D-746-52T) [1] | —98 | —73 | —55 |

[1] Modified to indicate temperature at which 20% of the specimens fail

It will be noted that adding about 5 to 11 parts by weight in rubber compound concentration per hundred parts of polyethylene produces a 25° and 43° C. increase respectively in the brittle temperature. These results are indicative of the adverse effects caused by the incorporation of a rubber compound in polyethylene.

Rubber suitable for use in the compositions of the present invention are the natural and synthetic rubber compounds made up of carbon and hydrogen atoms only. Preferred hydrocarbon rubbers are homopolymers of butadiene and isobutylene, i.e. polybutadiene and polyisobutylene or a copolymer thereof. Preferred are copolymers of butadiene or isobutylene with an unsaturated hydrocarbon monomer, for example, the butyl rubbers, copolymers of butadiene and isoprene, GRS rubbers, copolymers of butadiene and styrene. Particularly preferred are the butyl rubbers and polyisobutylene because of their superior electrical properties and greater resistance to oxidation.

The ethylene polymers useful in the practice of my invention where the material is to be used as wire insulation, are those characterized by having less than 10% deformation at 115° C. according to the test prescribed by the Underwriter's Laboratories Inc. in the booklet dated February, 1955, "Standards for Thermoplastic Insulated Wires." In general, these polymers have densities above about 0.94. Those having a lower density but which exhibit less than 10% deformation at 115° C. can also be employed, however. Where the polymers are to be extruded, a melt index below about 3 for the polyethylene is preferred. A higher melt index polymer extruded into wire insulation is prone to stress rupture at temperatures above 70° C. and to brittleness at low temperatures. The preferred melt index range for polymers to be extruded as wire insulation is between about 0.01 and 1. Polymers with a melt index below 0.01 provide superior wire insulating properties but are generally too difficult to process in commercially available equipment.

The above-described polymers can be rendered flame-retarded by incorporating therein flame retardant mixtures such as chlorinated paraffin wax mixed with metal oxides such as antimony oxides, zinc oxide and aluminum oxide. I particularly prefer a mixture of antimony trioxide and chlorinated paraffin wax, such as disclosed in U.S. Patent No. 2,669,521.

The term "flame-retarded" as used herein describes polyethylenic materials which exhibit reduced combustibility i.e. materials which are less prone to burn than polyethylene resin itself. A "flame-retardant" as used herein is a compound or mixture which is less combustible than polyethylene and which when added to polyethylene decreases its tendency to burn.

Because the adverse effect on the brittle temperature of the polyethylene is progressively increased with increases in the flame-retardant content of the composition, it is preferred to incorporate only as much flame-retardant as is needed to render the polyethylene suitable for the intended application. Thus where only a slight degree of flame-retardance is required e.g. lamp cords, minimum amounts of a flame-retardant are used. But in applications where a vigorous standard of non-combustibility must be met, as in polyethylene which is to be used in building wire insulation, sufficient amounts of flame-retardant must be incorporated in the composition to render it "flame-resistant" i.e. able to pass the tests set up by the Underwriter's Laboratories Inc. to test flame-resistance or non-combustibility. This test is set forth in great detail on pages 17, 18 and 19 of their April, 1948 booklet, entitled "Standard for Thermoplastic-Insulated Wires."

Amounts ranging from about 17 to 100 parts by weight of the flame-retardant per hundred parts combined weight of the polyethylene and rubber provide a beneficial degree of flame-retardance and can be employed in the composition of the present invention. Below 17 parts by weight the improvement in flame-retardance is negligible. Amounts above 35 parts by weight confer an adequate degree of flame-resistance and do not detract severely from the electrical and physical properties of the resin and hence are preferred, but amounts in excess of 85 and especially in excess of 100 parts by weight have too great an adverse effect on other important electrical and physical properties and do not provide a significantly greater degree of flame-resistance.

Although by an increase in rubber concentration, improved brittle temperature and stress rupture characteristics are achieved, too high a proportion of rubber in the final composition causes a reduction in the strength and hardness of the composition. Thus, properties essential to wire insulation such as tensile strength, elongation, hardness and stiffness in torsion are adversely affected by concentrations of rubber exceeding 70 parts by weight per hundred parts of polyethylene in the composition. It is preferred to employ less than 50 parts by weight of the rubber. With regard to the lower limit of rubber concentration, less than about 5 parts by weight does not improve the brittle temperature or stress rupture characteristics of the flame-resistant polyethylene composition. 10 to 50 parts by weight of rubber per hundred parts of polyethylene is the optimum concentration in that it provides satisfactory strength and greatly improved brittle temperature.

The new compositions may also contain various substituted phenols, thiobisphenols, aromatic amines, dyes, pigments, carbon black, ultraviolet light absorbents, fatty acid amides, waxes, clays, alkaline earth carbonates and such other antioxidants, stabilizers, lubricants, colorants, fillers and modifiers as are generally incorporated into polyethylenic compositions.

The new compositions may be prepared by any of the procedures ordinarily used to mix and compound polyethylene resin compositions. For example, the several components can be mixed together in a ribbon blender, Hobart mixer, paddle blender or the like. It is usually preferred to conduct at least a portion of the mixing at a temperature high enough to flux the polyethylene resins, whereby better uniformity and product homogeneity are achieved. The hot mixing can be performed satisfactorily in a Banbury mixer, on a two roll mill, in a compounding extruder, or with other means well known to the art. In some instances a portion of the compounding sequence can be combined with the forming operation, as for example by accomplishing the final mixing in the barrel of the forming extruder. Also, various combinations of the foregoing and of equivalent techniques can be employed.

The polyethylene composition of my invention can be compression or injection molded, calendered, and extruded. Articles such as switch plates and boxes, electrical insulation, coatings and wire coverings are applications wherein the novel composition herein described can be used to outstanding advantage.

It is preferred to employ an antioxidant for the polyethylene, such as a thiobisphenol, a secondary aromatic amine, a hindered phenol or the like. In addition, it is preferred to use a heat stabilizer for the chlorinated paraffin wax flame-retardant such as the dibasic lead phosphites, and where electrical properties are not critical, barium-cadmium laurates, organo tin compounds, and epoxidized oils and esters. To provide a clearer understanding of the invention the following examples are presented. Their results are provided in tabular form.

Table II below indicates the components and their amount in each composition tested. Table III below identifies the tests performed and the results obtained with each of the compositions.

In preparing a composition for testing the following procedure was followed.

A 30 pound mixture was prepared according to the proportions given for the composition in Table II. The components were blended for 10 minutes in a Banbury mixer. Conditions of the mixer were: 45–80 p.s.i. on the ram; cold water was circulated through the jacket at such a rate that the temperature of the fluxed mixture rose gradually to about 120 to 145° C. during the blending period. The compositions were removed from the Banbury mixer and sheeted on an equal speed two-roll mill maintained at a temperature between about 110–125° C.

In each example the higher temperature was used with the higher density resin and conversely the lower temperature was used with the lower density resins. A ⅛" thick sheet was stripped from the mill and part of it divided into 8" by 8" sections. These sections were compression molded into squares 8" by 8" by 0.075" and set aside for testing. The remaining material after cooling was granulated and extruded onto wire and run through a cooling bath.

Conditions of the extrusion were:

Composition temperature_____ 190–210° C.
Wire type_____ #14 AWG copper wire.
Wire temperature_____ 95–120° C.
Rate of wire through extruder___ 90 ft./min.
Extruder type_____ Royle #1 2-inch bore wire extruder.
Die dimensions_____ 0.128" diameter wire coating die.
Cooling bath temperature_____ 70° C.

The compositions tested and the results of the tests are summarized in Tables II and III respectively.

TABLE II

*Composition*

[All parts by weight]

| | Control | 1 | 2 | 3 | 4 | 5 | 6 | 6 | 7 | 9 | 10 | 11 | 12 | 13 |
|---|---|---|---|---|---|---|---|---|---|---|---|---|---|---|
| Polyethylene: | | | | | | | | | | | | | | |
| (a) sp. gr. 0.95, M.I. 0.2* | 59.9 | 54.9 | 49.9 | 49.9 | 58.2 | 44.9 | 57.9 | 39.9 | 49.9 | 49.9 | 49.9 | 49.9 | | |
| (b) sp. gr. 0.944, M.I. 0.3* | | | | | | | | | | | | | 49.9 | |
| (c) sp. gr. 0.936, M.I. 0.3* | | | | | | | | | | | | | | 49.9 |
| Antimony oxide | 24 | 24 | 24 | 24 | 17.6 | 24 | 18.9 | 30.5 | 24 | 24 | 24 | 24 | 24 | 24 |
| Chlorinated paraffin wax (70%) [1] | 14 | 14 | 14 | 14 | 10.4 | 14 | 11.1 | 17.5 | 14 | 14 | 14 | 14 | 14 | 14 |
| Dibasic leadphosphite [2] | 2 | 2 | 2 | 2 | 2 | 2 | 2 | 2 | 2 | 2 | 2 | 2 | 2 | 2 |
| Antioxidant [3] | 0.1 | 0.1 | 0.1 | 0.1 | 0.1 | 0.1 | 0.1 | 0.1 | 0.1 | 0.1 | 0.1 | 0.1 | 0.1 | 0.1 |
| Butyl Rubber [4] | 0 | 5 | 10 | 10 | 11.7 | 15 | 10 | 10 | | | | | 10 | 10 |
| Natural Rubber [5] | | | | | | | | | | | | 10 | | |
| GRS Rubber [6] | | | | | | | | | | | 10 | | | |
| GRS Rubber [7] | | | | | | | | | | 10 | | | | |
| Polyisobutylene [8] | | | | | | | | | 10 | | | | | |

*0% deformation at 115° C.
[1] Chlorowax 70.
[2] Dyphos.
[3] Santowhite Crystals 4/4′ thiobis (6-tert-butyl-meta-cresol).
[4] GRI-17.
[5] Standard Oil Devel. Co.'s CD-120-50, a clean, thin pale crepe rubber.
[6] 20% styrene (Plioflex 1502).
[7] 13% styrene (Naugapol 1023).
[8] Enjay's Vistanex B-80.

TABLE III

| Property | Control | 1 | 2 | 3 | 4 | 5 | 6 |
|---|---|---|---|---|---|---|---|
| Sp. gravity (23°/23°), ASTM D-792-50 | 1.282 | 1.290 | 1.291 | 1.284 | | | 1.226 |
| Melt Index (dg./min.), ASTM D-1238-52T | 0.76 | 0.56 | 0.72 | 0.76 | | | 0.71 |
| Stiffness in torsion (p.s.i. @ 23° C.), ASTM D-1043-49T | 125,000 | | 65,000 | 53,000 | 70,000 | 67,000 | 80 |
| Durometer Hardness ("D" scale), ASTM D-676-42T | 62 | 54 | 52 | 46 | 49 | 48 | 50 |
| Shear Strength (p.s.i.), ASTM D-732-46 | 2,630 | | 1,700 | 1,500 | | | 1,770 |
| Ultimate Elongation (Percent): [1] | | | | | | | |
| original | 100 | 700 | 750 | 750 | | 825 | 77 |
| aged 7 days @ 100° C | 100 | 700 | 900 | 900 | | | 25 |
| Tensile Strength (p.s.i.): [1] | | | | | | | |
| original | 3,150 | 2,700 | 2,000 | 1,580 | 2,100 | 2,000 | 2,400 |
| aged 7 days @ 100° C | 3,570 | 3,660 | 2,200 | 1,670 | | | 2,400 |
| ¼″ Mandrel Bend (40° C.): [1] * | | | | | | | |
| original | pass | pass | pass | pass | pass | pass | pass |
| aged 7 days @ 100° C | pass | pass | pass | pass | pass | pass | pass |
| Dielectric Strength (volts) [1] | | | | | 37,000 | 42,000 | 26,000 |
| Direct Current Resistivity (megohm-cm.): [1] | | | | | | | |
| 23° C | | | | | $>5.3 \times 10^7$ | $>5.3 \times 10^7$ | |
| 50° C | | | | | $>5.3 \times 10^7$ | $>5.3 \times 10^7$ | |
| Percent Deformation at 120° C. [1] | 4 | 5 | 7 | 6 | 5 | 5 | 1 |
| Brittle Temperature (°C.), ASTM D-746-52T** | +32 | −10 | −26 | −31 | −22 | −32 | −30 |
| Flame Resistance: [1] | | | | | | | |
| Percent burned | 0 | 0 | 0 | 0 | 0 | 0 | 0 |
| burning time (sec.) | 0 | 0 | 0 | 0 | 0 | 0 | 0 |

| Property | 7 | 8 | 9 | 10 | 11 | 12 | 13 |
|---|---|---|---|---|---|---|---|
| Sp. gravity (23°/23°) ASTM D-792-50 | 1.396 | 1.280 | 1.295 | 1.288 | 1.288 | 1.265 | 1.266 |
| Melt Index (dg./min.), ASTM D-1238-52T | 0.78 | 0.43 | 0.12 | 0.14 | 0.58 | 0.62 | 0.78 |
| Stiffness in torsion (p.s.i. @ 23° C.), ASTM D-1043-49T | 58.5 | 70 | 65 | 70 | 60 | 49 | 50 |
| Durometer Hardness ("D" scale), ASTM D-676-42T | 49 | 52 | 49 | 46 | 49 | 46 | 43 |
| Shear Strength (p.s.i.), ASTM D-732-46 | 1,430 | 1,790 | 1,750 | 1,900 | 1,800 | 1,460 | 1,330 |
| Ultimate Elongation (Percent): [1] | | | | | | | |
| original | 50 | 60 | 50 | 62 | 565 | 760 | 150 |
| aged 7 days @ 100° C | 50 | 70 | 20 | 59 | 55 | 250 | 175 |
| Tensile Strength (p.s.i.): [1] | | | | | | | |
| original | 1,630 | 2,090 | 1,890 | 2,070 | 2,010 | 1,740 | 1,490 |
| aged 7 days @ 100° C | 1,640 | 2,630 | 2,230 | 2,090 | 1,740 | 1,710 | 1,560 |
| ¼″ Mandrel Bend (40° C.): [1] * | | | | | | | |
| original | pass | pass | pass | pass | pass | pass | pass |
| aged 7 days @ 100° C | pass | pass | pass | pass | pass | pass | pass |
| Dielectric Strength (volts) [1] | 14,000 | 21,000 | 23,000 | 19,000 | 21,000 | 25,000 | 21,000 |
| Direct Current Resistivity (megohm-cm.): [1] | | | | | | | |
| 23° C | | | | | | | |
| 50° C | | | | | | | |
| Percent Deformation at 120° C. [1] | 18 | 4 | 4 | 6 | 9 | 11 | 29 |
| Brittle Temperature (°C.), ASTM D-746-52T** | −15 | −22 | −30 | −22 | −42 | −32 | −30 |
| Flame Resistance: [1] | | | | | | | |
| percent burned | 0 | 0 | 0 | 0 | 0 | 0 | 0 |
| burning time (sec.) | 0 | 0 | 0 | 0 | 0 | 0 | 0 |

[1] Test per "Standards for Thermoplastic-Insulated Wires," Underwriters' Laboratories, Inc, February 1955.
*Severity of test increased by use of ¼″ mandrel in place of prescribed 0.313″ mandrel.
**Modified to indicate temperature at which 20% of specimens tested failed.

Inspection of Table III reveals a surprising improvement in brittle temperature characteristics, i.e. a considerable decrease in the temperature at which the material fractures, upon the addition of a rubber compound without adverse effect on the flame-resistance or strength of the polyethylene. This improved brittle temperature is totally unexpected in view of usual deleterious effects of rubber addition to polyethylene shown by the data presented in Table I. This harmful increase in brittle temperature shown in Table I is to be contrasted with the beneficial improvement effected in brittle temperature shown by the data of Table III. In every case a substantial improvement in brittle temperature was effected. The production of such an unexpected result as the improvement in brittle temperature characteristics of polyethylene by addition of two types of compounds known to adversely affect this property, i.e. a flame-retardant and a rubber compound, could be caused only by a synergistic effect between the two additives. Such an effect is not evident from a knowledge of the nature of the additives and heretofore has been unsuspected.

Examples 1, 2 and 5 demonstrate the progressive improvement in brittle temperature and decrease in tensile strength obtained with an increase in the percentage of rubber employed. A comparison of Examples 6 and 7 points up the decrease in physical properties notably shear strength and tensile strength and in electrical properties, particularly dielectric strength caused by the addition of progressively greater amounts of the flame-retardant composition. The brittle temperatures, however, in each of the examples, surprisingly remain at a highly satisfactory level and all the compositions are flame-resistant. Thus, I have provided the first polyethylene composition which possesses the inherent electrical advantages of an ethylene polymer in combination with outstanding physical properties, particularly brittle temperatures and flame resistance.

What is claimed is:

1. A flame-retarded thermopastic composition comprising polyethylene having a density above about 0.94 and a percent deformation of less than 10% at 115° C., 5 to 70 parts by weight of a hydrocarbon rubber per 100 parts by weight of polyethylene, and 17 to 100 parts by weight of a flame-retardant mixture comprising a chlorinated paraffin wax and a metal oxide selected from the class consisting of antimony oxides, zinc oxide and aluminum oxide per 100 parts by weight of the polyethylene and the hydrocarbon rubber taken together.

2. A flame-retarded thermoplastic composition comprising polyethylene having a percent deformation of less than 10% at 115° C., 5 to 70 parts by weight of a hydrocarbon rubber per 100 parts by weight of polyethylene, and 17 to 100 parts by weight of a flame-retardant mixture comprising a chlorinated paraffin wax and a metal oxide selected from the class consisting of antimony oxides, zinc oxide and aluminum oxide per 100 parts by weight of the polyethylene and rubber taken together.

3. A flame-resistant thermoplastic composition comprising polyethylene having a percent deformation of less than 10% at 115° C., 10 to 50 parts by weight of a hydrocarbon rubber per 100 parts by weight of polyethylene and 35 to 85 parts by weight of a flame-retardant mixture comprising a chlorinated paraffin wax and a metal oxide selected from the class consisting of antimony oxides, zinc oxide and aluminum oxide per 100 parts by weight of the polyethylene and hydrocarbon rubber taken together.

4. A flame-resistant thermoplastic composition characterized by having a low brittle temperature comprising polyethylene having a percent deformation of less than 10% at 115° C., 10 to 50 parts by weight of a hydrocarbon rubber, and 35 to 85 parts by weight of a flame-retardant mixture comprising a chlorinated paraffin wax and antimony oxide per 100 parts by weight of the polyethylene and hydrocarbon rubber taken together.

5. The composition of claim 4 wherein the hydrocarbon rubber is butyl rubber.

6. The composition of claim 4 wherein the hydrocarbon rubber is polyisobutylene.

7. The method of producing flame-retarded thermoplastic compositions characterized by low brittle temperatures which includes the steps of adding to polyethylene having a percent deformation of less than 10% at 115° C., 5 to 70 parts by weight of a hydrocarbon rubber and 17 to 100 parts by weight of a flame-retardant mixture comprising a chlorinated paraffin wax and a metal oxide selected from the class consisting of antimony oxides, zinc oxide and aluminum oxide per 100 parts by weight of the polyethylene and flame-retardant taken together, mixing the components together and heating the components until the polyethylene fluxes and a homogeneous mass is obtained.

8. An electrical conductor coated with the composition claimed in claim 2.

References Cited in the file of this patent

UNITED STATES PATENTS

| | | |
|---|---|---|
| 2,830,919 | Schatzel | Apr. 15, 1958 |
| 2,918,940 | Carr | Dec. 29, 1959 |

UNITED STATES PATENT OFFICE
CERTIFICATE OF CORRECTION

Patent No. 2,993,019                                  July 18, 1961

John A. Snyder

It is hereby certified that error appears in the above numbered patent requiring correction and that the said Letters Patent should read as corrected below.

Column 1, line 32, for "effected" read -- affected --; lines 49 and 50, for "application" read -- applications --; columns 5 and 6, TABLE II, column 9, heading thereof, for "6" read -- 7 --; same TABLE II, column 10, heading thereof, for "7" read -- 8 --; column 7, line 28, for "thermopastic" read -- thermoplastic --.

Signed and sealed this 28th day of November 1961.

(SEAL)
Attest:

ERNEST W. SWIDER                                DAVID L. LADD

Attesting Officer                                   Commissioner of Patents

USCOMM-DC